(12) United States Patent
Lin et al.

(10) Patent No.: US 6,779,089 B2
(45) Date of Patent: Aug. 17, 2004

(54) LOCKED CONTENT ADDRESSABLE MEMORY FOR EFFICIENT ACCESS

(75) Inventors: Chang-Ming P. Lin, Mountain View, CA (US); Julianne Zhu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 10/042,905

(22) Filed: Jan. 9, 2002

(65) Prior Publication Data

US 2003/0131204 A1 Jul. 10, 2003

(51) Int. Cl.[7] .............................................. G06F 12/00
(52) U.S. Cl. ........................ 711/152; 711/163; 710/200
(58) Field of Search ................................ 711/152, 163; 710/200; 707/206; 709/229

(56) References Cited

U.S. PATENT DOCUMENTS

| | | | | |
|---|---|---|---|---|
| 5,341,491 A | * | 8/1994 | Ramanujan | 711/152 |
| 5,392,433 A | * | 2/1995 | Hammersley et al. | 710/200 |
| 5,948,062 A | * | 9/1999 | Tzelnic et al. | 709/219 |
| 6,247,025 B1 | * | 6/2001 | Bacon | 707/206 |
| 6,360,303 B1 | * | 3/2002 | Wisler et al. | 711/152 |
| 6,446,188 B1 | * | 9/2002 | Henderson et al. | 711/206 |
| 6,496,909 B1 | * | 12/2002 | Schimmel | 711/163 |
| 2004/0068607 A1 | * | 4/2004 | Narad | 711/108 |

* cited by examiner

*Primary Examiner*—Nasser Moazzami
(74) *Attorney, Agent, or Firm*—Blakely, Sokoloff, Taylor & Zafman LLP (57) ABSTRACT

A storage element stores entries corresponding to threads. Each of the threads has a request identifier and generates an access request to a memory for a memory usage of a memory block. Each of the threads corresponds to a fixed entry occupied at a predetermined location. A controller controls access to the memory. The access includes a lock phase before the memory usage and an unlock phase after the memory usage.

76 Claims, 7 Drawing Sheets

LOCKED CONTENT ADDRESSABLE MEMORY FOR EFFICIENT ACCESS

BACKGROUND

1. Field of the Invention

This invention relates to content addressable memory (CAM). In particular, the invention relates to CAM access.

2. Description of Related Art

When a memory region or memory block is accessed by multiple processors or agents, it is commonly necessary to provide a locking and unlocking structure to allow orderly accesses. When an agent or thread attempts to use a memory block, it has to determine if the block is free or available and if it can enter the memory block. If not, it has to wait until the block becomes available. When an agent finishes using the memory block, it updates the unlocking mechanism to unlock the memory block indicating to other threads that the memory block now is available.

A typical technique is to provide a fixed number of entries in a lock content addressable memory (CAM) and a fail queue. When the entries in the lock CAM are used up, subsequent requests will have to be placed in the fail queue waiting for their turns. If a request has to wait behind other requests requesting different memory blocks in the fail queue, there is a possibility that this request has to wait for a long time for an entry in the lock CAM even though the other requests and this request access to different memory blocks. Techniques to resolve this problem includes the use priority encoder. However, these techniques have a number of drawbacks. First, the processing speed is significantly impacted by the size of the CAM. Second, the test cases for the priority scheme may become prohibitively large. Third, the number of clock cycles for the lock and/or unlock operation may be high.

Therefore, there is a need to have a technique to provide efficient memory accesses from multiple agents or processors.

BRIEF DESCRIPTION OF THE DRAWINGS

The features and advantages of the present invention will become apparent from the following detailed description of the present invention in which.

DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

The present invention maybe implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, a logic circuit, a microcode, etc. When a process corresponds to a function, its termination corresponds to a return of the function to the calling function or the main function.

Figure 1:
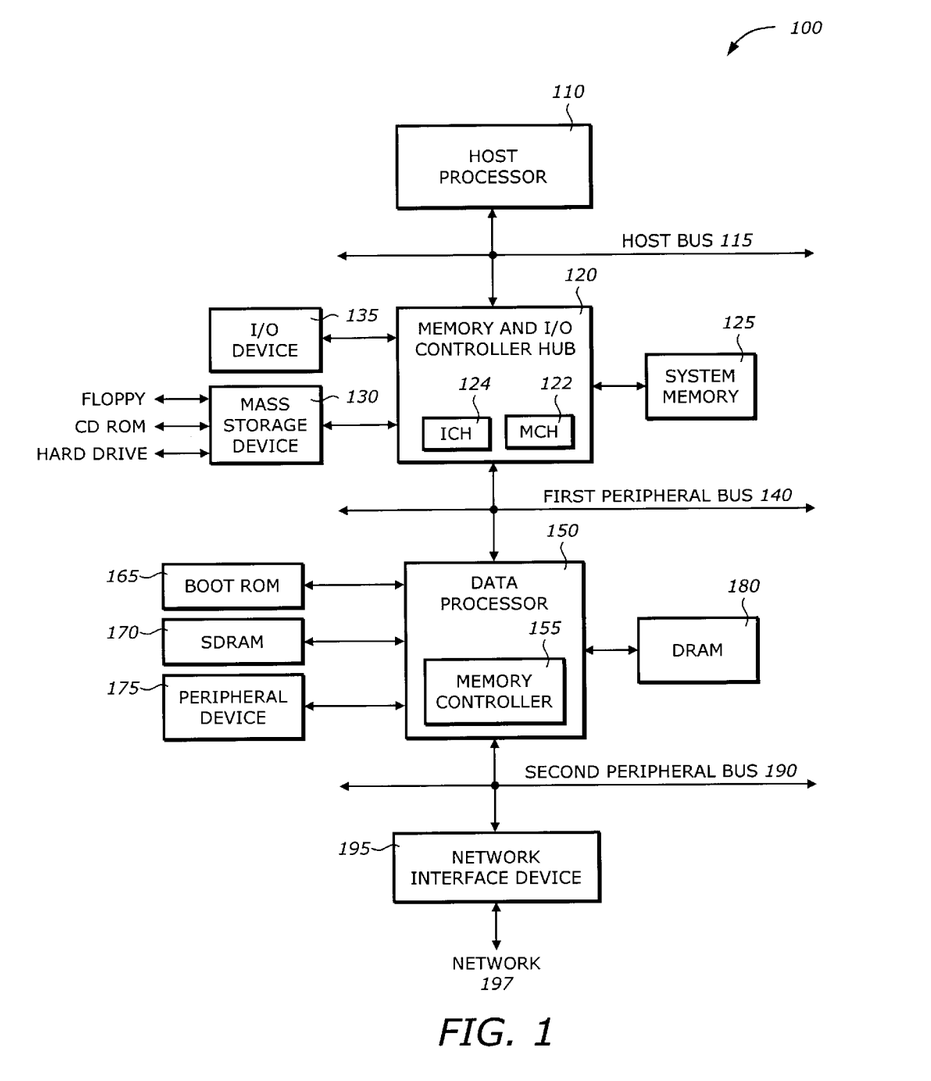
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a host bus 115, a memory and input/output (I/O) control hub (MIOCH) 120, a system memory 125, a mass storage device 130, an I/O device 135, a first peripheral bus 140, a network processor 150, a boot read only memory (ROM) 165, a static random access memory (SRAM) 170, a peripheral device 175, a dynamic random access memory (DRAM) 180, a second peripheral bus 190, and a network interface device 195.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host bus 115 provides interface signals to allow the processor 110 to communicate with other processors or devices, e.g., the MIOCH 120. The host bus 115 may support a uniprocessor or multiprocessor configuration. The host bus 115 may be parallel, sequential, pipelined, asynchronous, synchronous, or any combination thereof.

The MIOCH 120 provides control and configuration of memory and input/output devices such as the system memory 125, the mass storage device 130, and the I/O device 135. The MIOCH 120 includes a memory controller hub (MCH) 122 and an I/O controller hub (ICH) 124. The MCH 122 and the ICH 124 maybe separate or integrated into a single chipset. The MCH 122 provides memory interface and control functions to the system memory 125. The ICH 124 has a number of functionalities that are designed to support I/O functions. The ICH 124 may include a number of interface and I/O functions such as Peripheral Component Interconnect (PCI) bus interface, processor interface, interrupt controller, direct memory access (DMA) controller, power management logic, timer, universal serial bus (USB) interface, mass storage interface, low pin count (LPC) interface, etc. For clarity, not all the peripheral buses (e.g., accelerated graphics port (AGP), Industry Standard Architecture (ISA) bus, and Universal Serial Bus (USB)) are shown.

The system memory 125 stores system code and data. The system memory 125 is typically implemented with dynamic random access memory (DRAM) or static random access memory (SRAM). The system memory may include program code or code segments implementing one embodiment of the invention. The system memory 125 may also include other programs or data which are not shown, such as an operating system.

The mass storage device 130 stores archive information such as code, programs, files, data, applications, and operating systems. The mass storage device 130 may include compact disk (CD) ROM 132, floppy diskettes 133, and hard drive 134, and any other magnetic or optic storage devices. The mass storage device 130 provides a mechanism to read machine-readable media. The I/O device 135 may include any I/O devices to perform I/O functions. Examples of the I/O device 135 include controller for input devices (e.g., keyboard, mouse, trackball, pointing device), media card (e.g., audio, video, graphics), network card, and any other peripheral controllers.

The first peripheral bus 140 provides interface between the MIOCH 120 and the network processor 150. The first peripheral bus 140 may be any bus supported by the MIOCH 120. In one embodiment, the first peripheral bus 140 is the PCI bus.

The data processor 150 is a processor having fast processing power to perform a variety of operations in networking, communications, and other data-intensive tasks. The data processor 150 has a fast interface to memory elements such as the SRAM 170 and the DRAM 180, and processing power to perform efficient manipulation on bits, bytes, words, and longword data. In one embodiment, the data processor 150 is a network processor having high processing power for network applications such as packet forwarding of several million Ethernet packets per second at Layer 3. The data processor 150 has a memory controller 155 to control the boot ROM 165, the SRAM 170, and the peripheral device 175. The memory controller 155 controls accesses to the SRAM 170 to arbitrate access conflicts and/or to provide locking and unlocking mechanisms for memory usage from several sources such as agents or threads.

The boot ROM 165 contains program or code that controls the execution of the data processor 150 upon booting up or reset. The SRAM 170 may be any SRAM device including pipelined burst double cycle deselect (DCD) and flow through SRAM. The SRAM 170 contains data or tables accessed by the data processor 150. The peripheral device 175 may be any peripheral device. The DRAM 180 provides lower cost storage for less demanding data such as forwarding information and transmit queues.

The second peripheral bus 190 provides interface to other devices for the data processor 150. The second peripheral bus 190 supports attachment of specialized network devices, framers, custom logic devices, and other data processors. In one embodiment, the second peripheral bus 190 is the IX bus. The network interface device 195 provides interface to a network 197. The network 197 may be a local area network (LAN), a wide area network (WAN), an Internet, an intranet, an extranet, or any other types of network.

Figure 2:
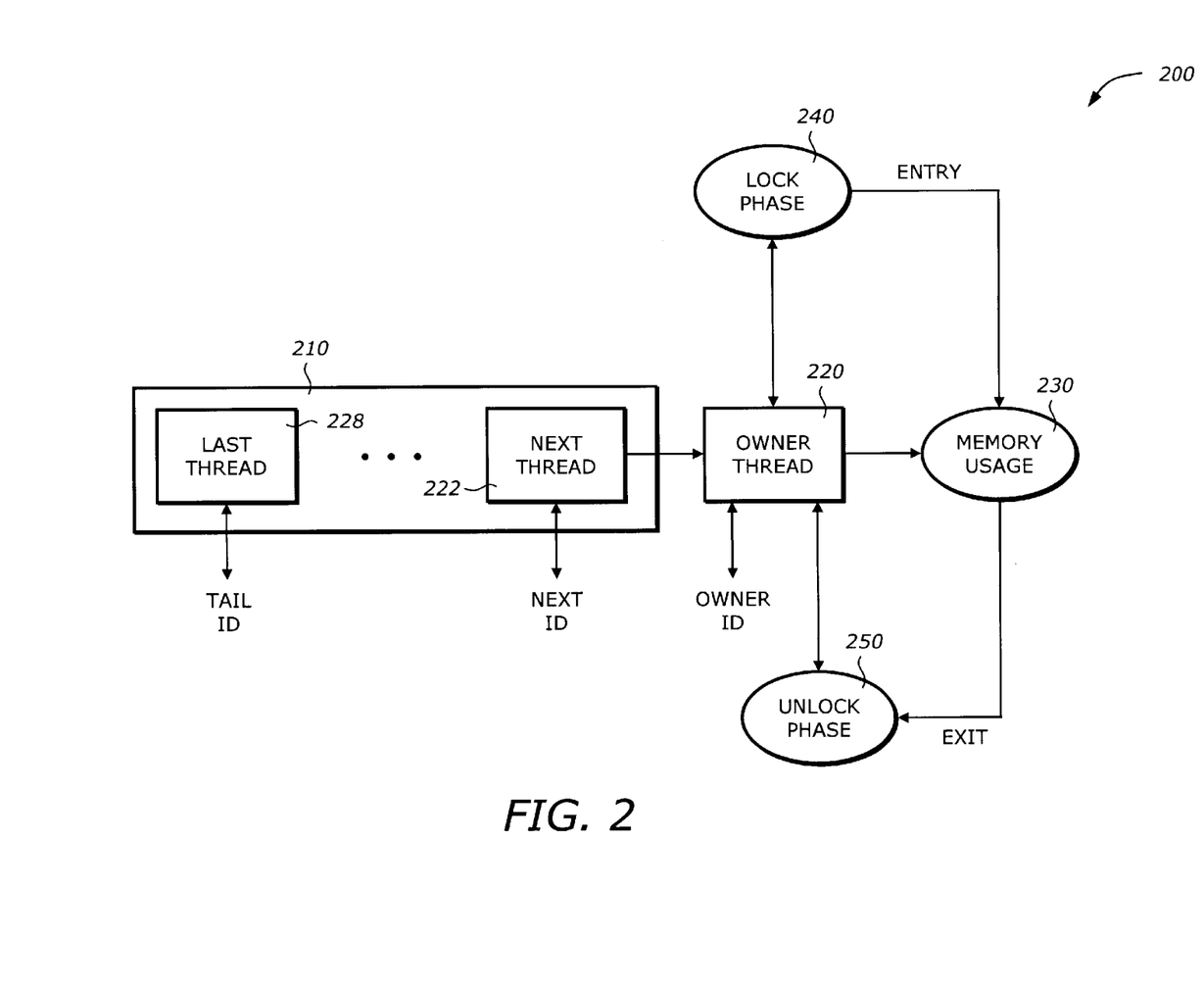
FIG. 2 is a diagram illustrating a model for memory access according to one embodiment of the invention.

FIG. 2 is a diagram illustrating a model 200 for memory access according to one embodiment of the invention. The model 200 includes a thread queue 210, a memory usage 230, a lock phase 240, and an unlock phase 250.

The thread queue 210 stores the threads that request access to the memory or request the memory usage 230. This request may be represented by a memory address. When a thread generates an access request, a request detector determines if this request corresponds to a memory block that is currently in use, i.e., being accessed by another thread. If it is, the request thread has to wait in the queue. The first thread in the queue is the next thread 222 identified by a next identifier (ID) and the last thread in the queue is the last thread 228 identified by the tail identifier (ID). The size of the queue is determined by the system requirements. If the request does not correspond to a memory block currently in use, the thread will be allowed to proceed to use the memory, i.e., to enter the memory usage 230. At that time the thread becomes the owner thread 220 identified by an owner identifier (ID). The owner threads owns the memory block or accesses the memory block. Before the owner thread 220 enters the memory block, it enters the lock phase 240 to lock access to the memory block, i.e., to set up a flag or indicator that the memory block is currently in use so that subsequent threads are prevented from accessing the memory. When the owner thread finishes using the memory, it leaves the memory usage 230 and exits to the unlock phase 250. The owner thread 220 unlocks access to the memory block so that the next thread 222 or subsequent thread can use the memory block.

The concept of locking and unlocking a memory block discussed above is similar to the concept of critical region or mutual exclusion in operating systems. A typical mechanism used in an operating system for critical regions is the use of a semaphore. Although the concept is similar, the implementation is markedly different. While the mechanisms used in an operating system are implemented by software, the mechanism used in this invention is implemented by hardware for speed. Since the data processor 150 (FIG. 1) is designed for fast memory accesses, the locking or unlocking has to be performed very fast and efficiently.

Figure 3:
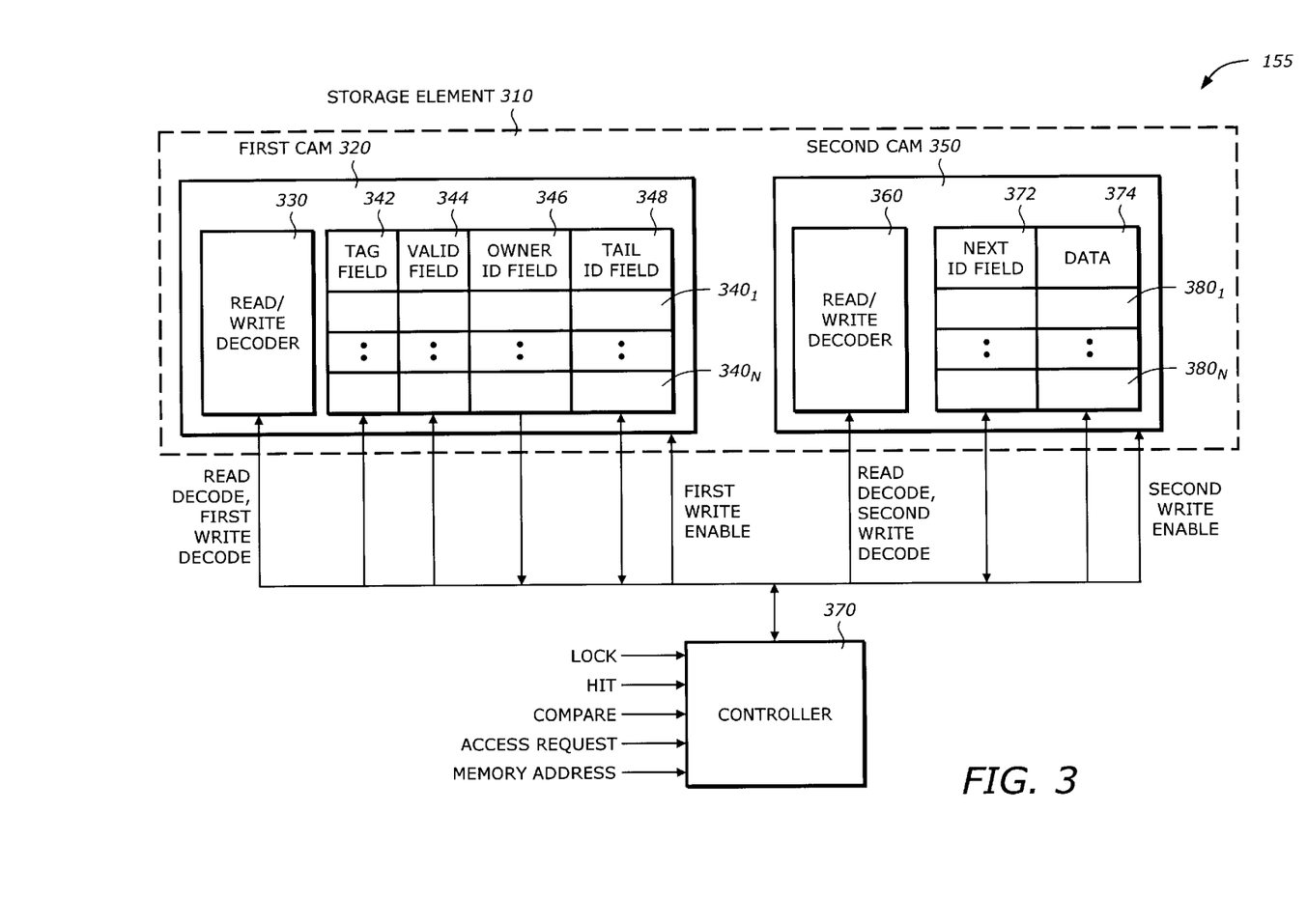
FIG. 3 is a diagram illustrating a memory controller shown in FIG. 1 according to one embodiment of the invention.

FIG. 3 is a diagram illustrating the memory controller 155 shown in FIG. 1 according to one embodiment of the invention. The memory controller 155 includes a storage element 310 and a controller 370.

The storage element 310 stores entries corresponding to the threads. Each of the threads has a request identifier and generates an access request to the memory (e.g., SRAM 170) for a memory usage. The storage element 310 includes a first content addressable memory (CAM) 320 and a second CAM

350. The first and second CAM's 320 and 350 may be separated or may be integrated.

The first CAM 320 includes a read/write decoder 330 and a memory array organized to correspond to a number of entries 340$_1$ to 340N. The read/write decoder 330 receives read decode and first write decode information from the controller to decode to address location that points to one of the entries 340$_1$ to 340N for a read and a write operation, respectively. The entries are organized into a number of fields. These fields include a tag field 342, a valid field 344, an owner ID field 346, and a tail ID field 348. The tag field 342 contains the portion of the memory address of the access request generated by a requesting thread. This tag field 342 may be read out to determine if an access request results in a hit or a miss. A hit corresponds to an access request to an occupied memory block, or the requested memory block is being used. A miss corresponds to an access request to a free memory block, or the requested memory block is not in use. The valid field 344 contains a valid indicator, typically a one-bit value, to indicate whether the corresponding entry or the corresponding identifiers in the entry is/are valid. The owner ID field 346 contains the owner ID of the owner thread that is currently using the requested memory block or having the memory usage. The technique employed in the invention achieves an efficient locking and unlocking mechanism by designating a predetermined address or location to each thread. Each thread therefore corresponds to a predetermined or fixed entry in the first CAM 320. This designation simplifies the addressing of the entries and improve the execution time for the locking and unlocking operations. The tail identifier field 348 contains a tail identifier that corresponds to a last thread in a thread queue (e.g., the thread queue 210 in FIG. 2).

The second CAM 350 includes a read/write decoder 360 and a memory array organized to correspond to a number of entries 340$_1$ to 340N. The read/write decoder 330 receives read decode and first write decode information from the controller to decode to address location that points to one of the entries 380$_1$ to 380N for a read and a write operation, respectively. The entries are organized into a number of fields. These fields include a next ID field 372 and a data field 374.

The next ID field 372 contains a next identifier that corresponds to a next thread requesting the memory usage. The data field 374 contains a data value that corresponds to the memory address in the tag field 342.

The controller 370 controls access to the memory. As discussed above with regard to FIG. 2, access control includes a lock phase before the memory usage and an unlock phase after the memory usage. The controller 370 receives signals from other circuits to generate control signals and update the storage element 310. The input signals to the controller 370 include a lock signal, a hit signal, a compare signal, an access request signal, and a memory address. The lock signal indicates if the current operation is a lock or unlock operation. The hit signal indicates if a memory request corresponds to an occupied block. The compare signal indicates result of a comparison between the read out owner ID and tail ID. Typically, these signals are active TRUE, i.e., the signal is asserted high if the corresponding condition is true. For example, the lock signal is asserted if the current operation is a lock operation, negated if unlock operation, and don't care in other cases. The hit signal is asserted TRUE if the access request results in a hit and is negated FALSE if the access request results in a miss. The compare signal is asserted TRUE if the read owner ID is different than the read tail ID.

The controller 370 generates a read decode and a first write decode, to the first CAM 320, a read decode and a second write decode to the second CAM 350. In addition, the controller 370 generates appropriate values or identifiers to the tag field 342, valid field 344, owner ID field 346, tail ID field 348, next ID field 372, and data field 374. The controller 370 also reads owner ID, tail ID, and next ID to owner ID field 346, tail ID field 348, and next ID field 372, respectively.

Figure 4:
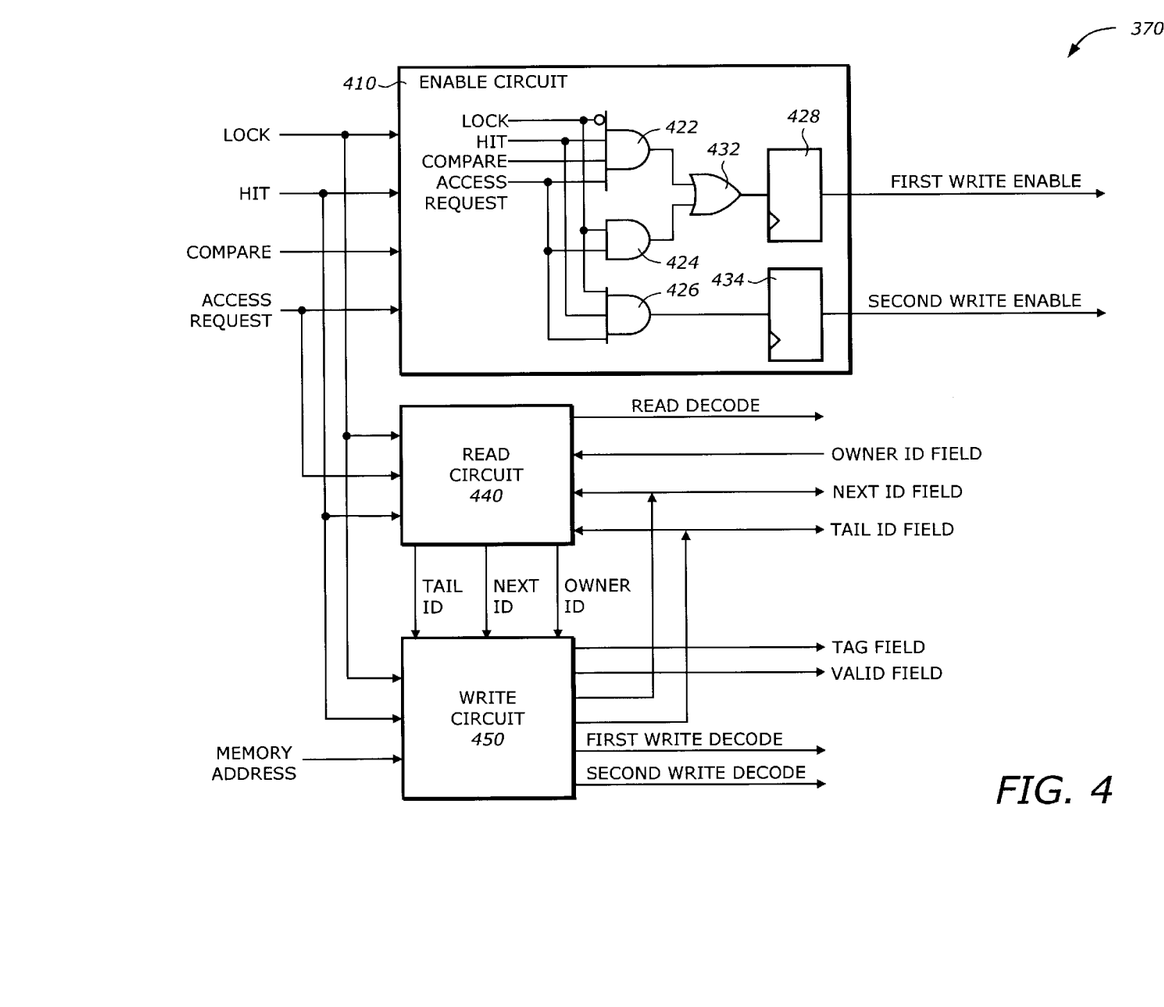
FIG. 4 is a diagram illustrating a controller shown in FIG. 3 according to one embodiment of the invention.

FIG. 4 is a diagram illustrating the controller 370 shown in FIG. 3 according to one embodiment of the invention. The controller 370 includes an enable circuit 410, a read circuit 440, and a write circuit 450.

The enable circuit 410 enables the storage element 310 during the write mode. The enable circuit 410 receives the lock signal, the hit signal, the compare signal, and the access request signal and generates a first and second write enable signals to enable the first and second CAM 320 and 350, respectively. The enable circuit 410 includes AND gates 422, 424, and 426, and OR gate 432 and registers 428 and 434. In essence, the first write enable signal is asserted when either the lock and access request signals are asserted or the lock signal is negated and the hit, compare, and access request signals are asserted. The first and second write signals are stored in the registers 428 and 434.

The read circuit 440 generates the read decode to the storage element 310 and reads an entry from the storage element 310 according to a result of the access request in a first cycle. The relevant fields in the entry are the owner ID, next ID, and tail ID fields. The read circuit 440 receives the access request, lock, and hit signals. When there is an access request that results in a hit, the read circuit 440 reads the owner ID field and the tail ID field during lock phase (e.g., lock signal is asserted) and reads the owner ID field, tail ID field and next ID field during unlock phase (e.g., lock signal is negated). The read owner ID, tail ID, and next ID are stored in appropriate registers to be used by the write circuit 450 in the next cycle.

The write circuit 450 updates one of the entries according to the result of the access request either in the first cycle, in the second cycle, or in both cycles. The write circuit 450 receives the lock and hit signals and the memory address and generates the first and second write decodes, the tag value (e.g., memory address) to the tag field, valid indicator to valid field, and appropriate identifiers to next ID and tail ID fields.

The controller 370 updates the entries in the storage element 310 taking advantage of the fact that each thread is pre-assigned a fixed location in the first and second CAM's 320 and 330. To avoid contention between locks from the same thread, only one lock per thread is allowed. Since the first and second CAM's 320 and 350 have entries assigned at the same pre-defined locations, the reading of the entries is done with the same decoded address. However, for entry update, the first and second CAM's 320 and 350 have separate write decode. Furthermore, sine the entry for each thread is fixed, the owner ID field may be pre-programmed, either during initialization, booting up, or by hardwiring the data.

The controller 370 updates the storage element 310 according to whether the operation is a lock or an unlock. The operation can be completed in two clock cycles. As is known in one skilled in the art, the period of the clock should be sufficient to accommodate the processing delays. Compared to previous techniques, the invention reduces processing time from three clock cycles to two clock cycles.

The operations can be described as follows.

Lock Phase:

First cycle: If hit, read out owner ID and tail ID. If miss, do nothing and return.

Second cycle: If hit, write request ID to the tail ID field at the owner ID location; and write request ID to the next ID field at the tail ID location. If miss, write memory address to the tag field, indicator to valid field, and tail ID to request ID location.

Unlock Phase:

First cycle: If hit, write invalid indicator to valid field and read owner ID, next ID, and tail ID. If miss, do nothing and return.

Second cycle: If hit, compare owner ID and tail ID. Note that this comparison may be done in the first cycle. If they are different, write valid indicator to the valid field. At next ID location, write tail ID read from the first cycle to the tail ID field and write the memory address to the tag field.

Figure 5:
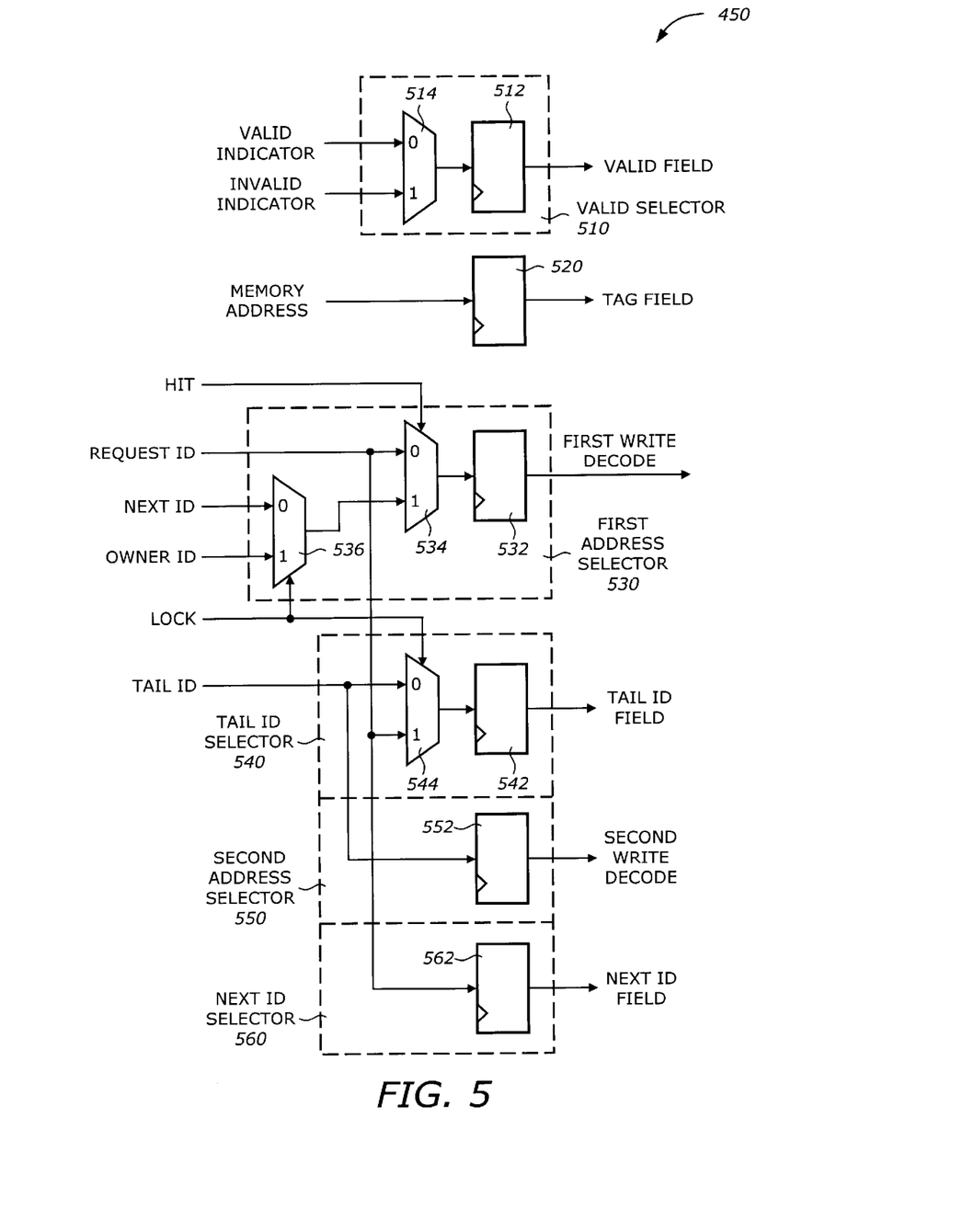
FIG. 5 is a diagram illustrating a write circuit shown in FIG. 4 according to one embodiment of the invention.

FIG. 5 is a diagram illustrating the write circuit 450 shown in FIG. 4 according to one embodiment of the invention. The write circuit 450 includes a valid selector 510, a tag register 520, a first address selector 530, a tail ID selector 540, a second address selector 550, and a next ID selector 560.

The valid selector 510 includes a register 512 and a multiplexer or data selector 514. The valid selector selects one of a valid indicator and an invalid indicator according to the operation (lock versus unlock) and the hit condition. The tag register 520 stores the memory address to be written to the tag field.

The first address selector 530 includes a register 532 and multiplexers or data selectors 534 and 536. The multiplexer 534 is controlled by the hit signal and the multiplexer 536 is controlled by the lock signal. The first address selector 530 selects one of the request ID, the next ID and the owner ID to generate the first write decode to the first CAM 320 (FIG. 3). The first address selector 530 selects the request ID when there is a miss, regardless of the lock signal. It selects the next ID when there is a hit in the unlock phase. It selects the owner ID when there is a hit in the lock phase.

The tail ID selector 540 includes a register 542 and a multiplexer or data selector 544. The multiplexer 544 is controlled by the lock signal. The tail ID selector 540 selects the tail ID read in the read circuit 440 during the unlock phase and the request ID during the lock phase.

The second address selector 550 may be implemented a register having the tail ID read in the read circuit 440. The second address selector provides the tail ID as the second write decode to the second CAM 350. The next ID selector 560 is a register that stores the request ID to be written to the next ID field.

Figure 6:
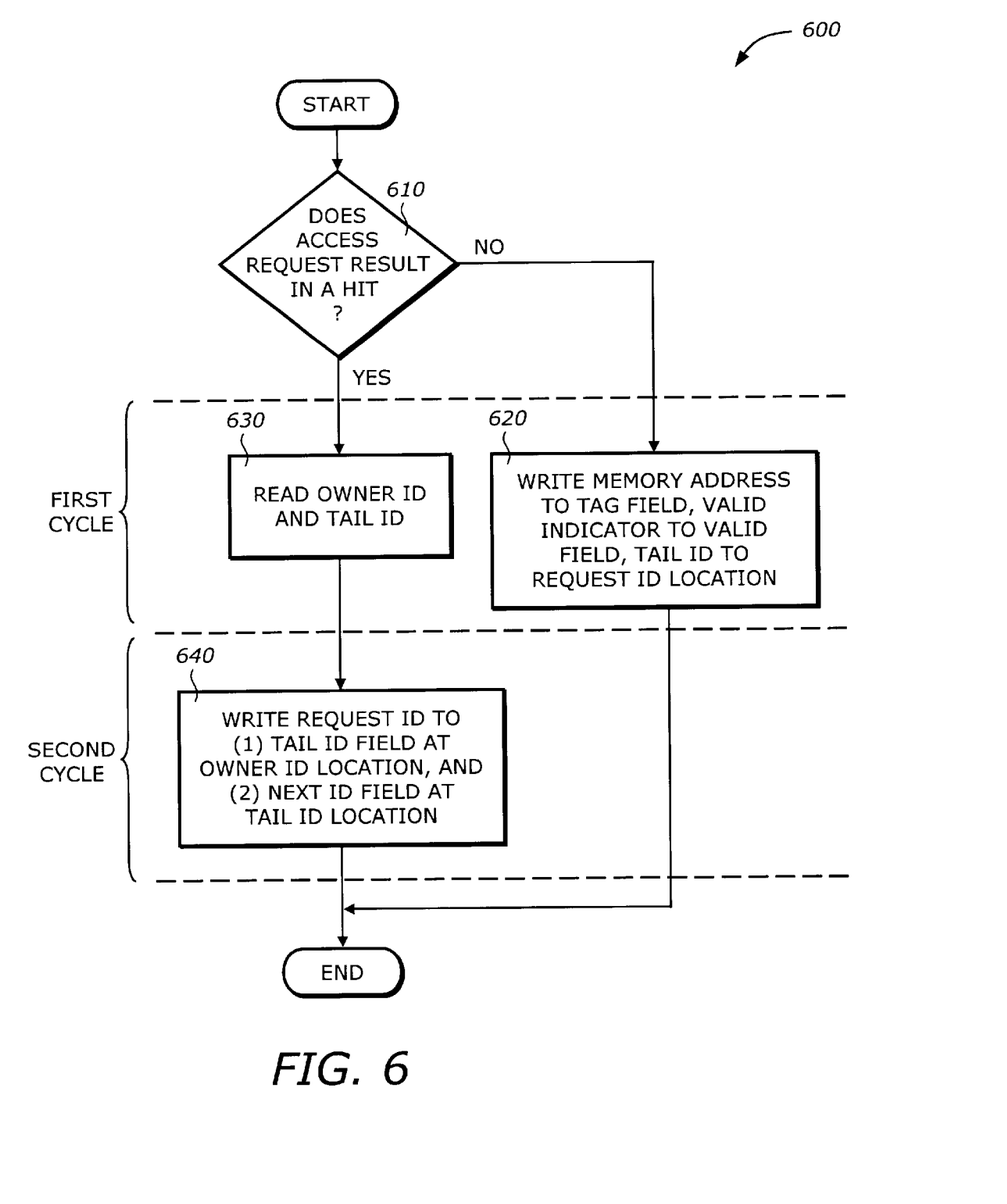
FIG. 6 is a flowchart illustrating a process for locking phase according to one embodiment of the invention.

FIG. 6 is a flowchart illustrating a process 600 for a lock operation according to one embodiment of the invention.

Upon START, the process 600 determines if the access request results in a hit (Block 610). If not, the process 600 writes the memory address to the tag field, writes a valid indicator to the valid field, and write the request ID to the tail ID field at the request ID location. The process 600 is then terminated. Otherwise, the process 600 reads the owner ID and the tail ID (Block 630). Blocks 630 and 620 are performed in the first cycle. Block 620 is performed in the second cycle.

Next, the process 600 writes the request ID to: (1) the tail ID field at the owner ID location, and (2) the next ID field at the tail ID location (Block 640). The block 640 is performed in the second cycle. The process 600 is then terminated.

Figure 7:
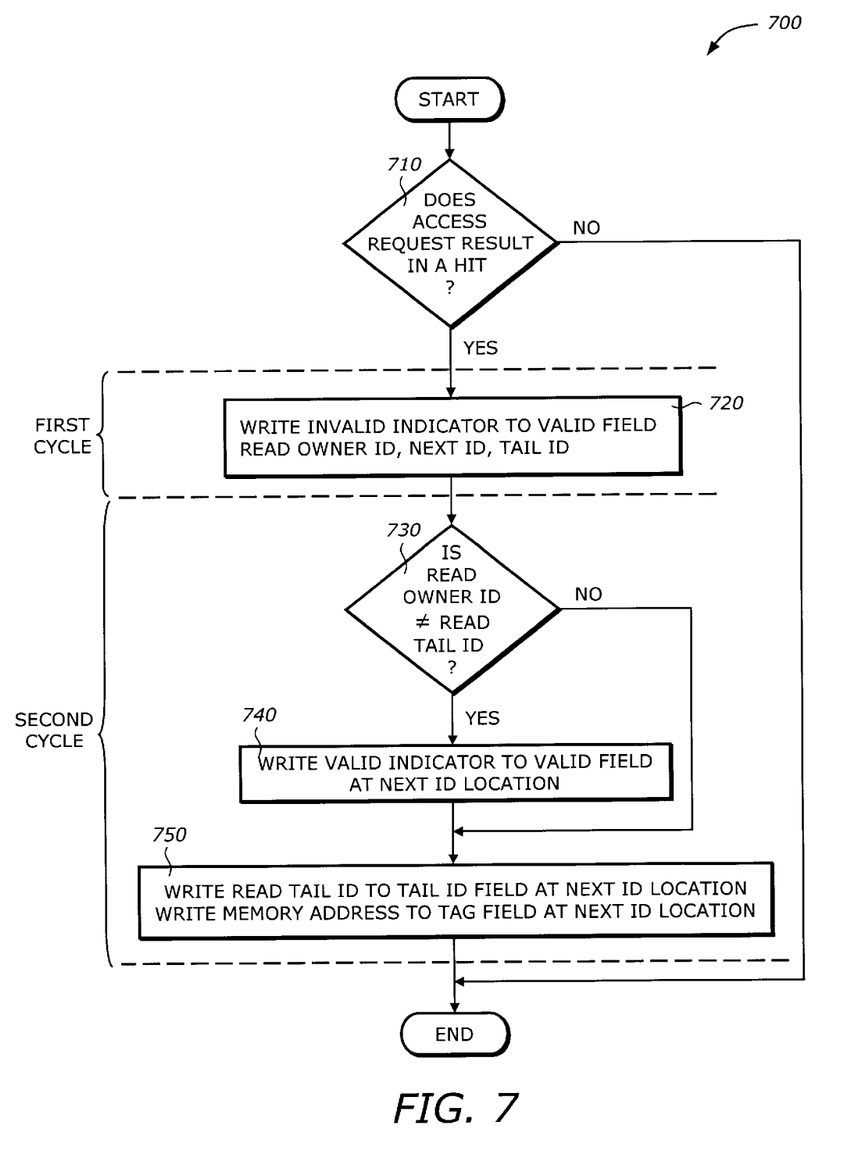
FIG. 7 is a flowchart illustrating a process for unlocking phase according to one embodiment of the invention.

FIG. 7 is a flowchart illustrating a process 700 for an unlock operation according to one embodiment of the invention.

Upon START, the process 700 determines if the access request results in a hit (Block 710). If not, the process 700 is terminated or exits. Otherwise, the process 700 writes an invalid indicator to the valid field and reads the owner ID, next ID, and tail ID from the storage element (Block 720). For hardware implementation, block 720 can be performed in the first clock cycle.

Then, the process 700 determines if the owner ID read in the first clock cycle is different than the tail ID read in the first clock cycle (Block 730). If so, the process 700 writes a valid indicator to the valid field (Block 740) and goes to block 750. Otherwise, the fact that the owner ID is the same as the tail ID indicates that there is no other waiting thread in the thread queue and therefore the process 700 skips the updating of the valid field and goes to block 750. At block 750, the process 700 writes the tail ID read in the first clock cycle to tail ID field and writes the memory address to the tag field both at the next ID location (Block 750). The process 700 is then terminated. Note that although blocks 740 and 750 are shown as two sequential blocks, they can be performed in parallel or at the same second clock cycle.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:

a storage element to store entries corresponding to threads, each of the threads having a request identifier and generating an access request to a memory for a memory usage of a memory block, each of the threads corresponding to a fixed entry occupied at a predetermined location; and a controller coupled to the storage element to control access to the memory, the access including a lock phase before the memory usage and an unlock phase after the memory usage; wherein each of the entries includes an owner ID field containing an owner identifier that corresponds to a thread currently having the memory usage, a tail identifier field containing a tail identifier that corresponds to containing an owner identifier that corresponds to a thread currently having the memory usage, a tail identifier field containing a tail identifier that corresponds to a last thread in a thread queue, and a next identifier field containing a next identifier that corresponds to a next thread requesting the memory usage.

2. The apparatus of claim 1 wherein each of the entries further includes a valid field containing an indicator that indicates if the corresponding identifiers are valid and a tag field containing a memory address of the access request.

3. The apparatus of claim 2 wherein the controller comprises:

a read circuit to read one of the entries according to a result of the access request in a first cycle; and a write circuit to update one of the entries according to the result in one of the first cycle and a second cycle.

4. The apparatus of claim 3 wherein the read circuit reads at least one of the owner identifier, the tail identifier, and the next identifier when the result indicates a hit.

5. The apparatus of claim 4 wherein during the second cycle of the lock phase, the write circuit writes the memory address to the tag field, a valid indicator to the valid field, and the read tail identifier to the tail identifier field at a location in the storage element corresponding to the request identifier when the result indicates a miss.

6. The apparatus of claim 3 wherein during the second cycle of the lock phase, the write circuit writes the request identifier to the tail identifier field at a location of the storage element corresponding to the read owner identifier when the result indicates a hit.

7. The apparatus of claim 3 wherein during the second cycle of the lock phase, the write circuit writes the request identifier to the next identifier field at a location of the storage element corresponding to the read tail identifier.

8. The apparatus of claim 3 wherein during the first cycle of the unlock phase, the write circuit writes an invalid indicator to the valid field if the result indicates a hit.

9. The apparatus of claim 3 wherein during the second cycle of the unlock phase, the write circuit writes a valid indicator to the valid field if the result indicates a hit and if the read owner identifier is different than the read tail identifier.

10. The apparatus of claim 3 wherein during the second cycle of the unlock phase, the write circuit writes the read tail identifier to the tail identifier field and the memory address to the tag field at a location in the storage element corresponding to the read next identifier.

11. The apparatus of claim 3 wherein the storage element comprises:
a first content addressable memory (CAM) to store the entries containing the tag field, the valid field, the owner identifier field, and the tail identifier field, the first CAM having a first read decoder to decode a read address and a first write decoder to decode a first write address; and
a second CAM to store the entries containing the next identifier field, the second CAM having a second read decoder to decode the read address as the first read decoder and a second write decoder to decode a second write address.

12. The apparatus of claim 11 wherein the write circuit comprises:
a first address selector to select write address for the first write decoder;
a tag register to store the memory address to write to the tag field;
a valid selector to select an indicator to write to the valid field; and
a tail identifier selector to select an identifier to write to the tail identifier field.

13. The apparatus of claim 12 wherein the write circuit further comprises:
a second address selector to select write address of the second write decoder; and
a next identifier selector to select an identifier to write to the next identifier field.

14. The apparatus of claim 12 wherein the first address selector selects the request identifier when the result indicates a miss.

15. The apparatus of claim 12 wherein the first address selector selects the read next identifier when the result indicates a hit in the unlock phase.

16. The apparatus of claim 12 wherein the first address selector selects the read owner identifier when the result indicates a hit in the lock phase.

17. The apparatus of claim 12 wherein the tail identifier selector selects the read tail identifier when the result indicates a hit in the unlock phase.

18. The apparatus of claim 12 wherein the tail identifier selector selects the request identifier when the result indicates a hit in the lock phase.

19. The apparatus of claim 13 wherein the second address selector selects the read tail identifier and the next identifier selector selects the request identifier when the result indicates a hit in the lock phase.

20. A method comprising:
storing entries corresponding to threads in a storage element, each of the threads having a request identifier and generating an access request to a memory for a memory usage of a memory block, each of the threads corresponding to a fixed entry occupied at a predetermined location; and controlling access to the memory, the access including a lock phase before the memory usage and an unlock phase after the memory usage; wherein each of the entries includes an owner ID field containing an owner identifier that corresponds to a thread currently having the memory usage, a tail identifier field containing a tail identifier that corresponds to a last thread in a thread queue, and a next identifier field containing a next identifier that corresponds to a next thread requesting the memory usage.

21. The method of claim 20 wherein each of the entries further includes a valid field containing an indicator that indicates if the corresponding identifiers are valid and a tag field containing a memory address of the access request.

22. The method of claim 21 wherein controlling access to the memory comprises:
reading one of the entries according to a result of the access request in a first cycle; and
updating one of the entries according to the result in one of the first cycle and a second cycle.

23. The method of claim 22 wherein reading one of the entries comprises reading at least one of the owner identifier, the tail identifier, and the next identifier when the result indicates a hit.

24. The method of claim 23 wherein updating one of the entries comprises during the second cycle of the lock phase, writing the memory address to the tag field, a valid indicator to the valid field, and the read tail identifier to the tail identifier field at a location in the storage element corresponding to the request identifier when the result indicates a miss.

25. The method of claim 22 wherein updating one of the entries comprises during the second cycle of the lock phase, writing the request identifier to the tail identifier field at a location of the storage element corresponding to the read owner identifier when the result indicates a hit.

26. The method of claim 22 wherein updating one of the entries comprises during the second cycle of the lock phase, writing the request identifier to the next identifier field at a location of the storage element corresponding to the read tail identifier.

27. The method of claim 22 wherein updating one of the entries comprises during the first cycle of the unlock phase, writing an invalid indicator to the valid field if the result indicates a hit.

28. The method of claim 22 wherein updating one of the entries comprises during the second cycle of the unlock phase, writing a valid indicator to the valid field if the result indicates a hit and if the read owner identifier is different than the read tail identifier.

29. The method of claim 22 wherein updating one of the entries comprises during the second cycle of the unlock phase, writing the read tail identifier to the tail identifier field and the memory address to the tag field at a location in the storage element corresponding to the read next identifier.

30. The method of claim 22 wherein storing entries comprises:

storing the entries containing the tag field, the valid field, the owner identifier field, and the tail identifier field in a first content addressable memory (CAM), the first CAM having a first read decoder to decode a read address and a first write decoder to decode a first write address; and storing the entries containing the next identifier field in a second CAM, the second CAM having a second read decoder to decode the read address as the first read decoder and a second write decoder to decode a second write address.

31. The method of claim 30 wherein updating one of the entries comprises:

selecting write address for the first write decoder;

storing the memory address to write to the tag field;

selecting an indicator to write to the valid field; and selecting an identifier to write to the tail identifier field.

32. The method of claim 31 wherein updating one of the entries further comprises:

selecting write address of the second write decoder; and selecting an identifier to write to the next identifier field.

33. The method of claim 31 wherein selecting write address for the first write decoder comprises selecting the request identifier when the result indicates a miss.

34. The method of claim 31 wherein selecting write address for the first write decoder comprises selecting the read next identifier when the result indicates a hit in the unlock phase.

35. The method of claim 31 wherein selecting write address for the first write decoder comprises selecting the read owner identifier when the result indicates a hit in the lock phase.

36. The method of claim 31 wherein selecting an identifier comprises selecting the read tail identifier when the result indicates a hit in the unlock phase.

37. The method of claim 31 selecting an identifier comprises selecting the request identifier when the result indicates a hit in the lock phase.

38. The method of claim 32 selecting write address of the second write decoder comprises selecting the read tail identifier and the next identifier selector selects the request identifier when the result indicates a hit in the lock phase.

39. A system comprising:

a memory; and a processor coupled to the memory, the processor having a memory controller to process access requests to the memory generated by threads, the memory controller comprising:

a storage element to store entries corresponding to the threads, each of the threads having a request identifier and generating an access request to the memory for a memory usage, each of the threads corresponding to a fixed entry occupied at a predetermined location; and a controller coupled to the storage element to control access to the memory, the access including a lock phase before the memory usage and an unlock phase after the memory usage; wherein each of the entries includes an owner ID field containing an owner identifier that corresponds to a thread currently having the memory usage, a tail identifier field containing a tail identifier that corresponds to a last thread in a thread queue, and a next identifier field containing a next identifier that corresponds to a next thread requesting the memory usage.

40. The system of claim 39 wherein each of the entries further includes a valid field containing an indicator that indicates if the corresponding identifiers are valid and a tag field containing a memory address of the access request.

41. The system of claim 40 wherein the controller comprises:

a read circuit to read one of the entries according to a result of the access request in a first cycle; and a write circuit to update one of the entries according to the result in one of the first cycle and a second cycle.

42. The system of claim 41 wherein the read circuit reads at least one of the owner identifier, the tail identifier, and the next identifier when the result indicates a hit.

43. The system of claim 42 wherein during the second cycle of the lock phase, the write circuit writes the memory address to the tag field, a valid indicator to the valid field, and the read tail identifier to the tail identifier field at a location in the storage element corresponding to the request identifier when the result indicates a miss.

44. The system of claim 41 wherein during the second cycle of the lock phase, the write circuit writes the request identifier to the tail identifier field at a location of the storage element corresponding to the read owner identifier when the result indicates a hit.

45. The system of claim 41 wherein during the second cycle of the lock phase, the write circuit writes the request identifier to the next identifier field at a location of the storage element corresponding to the read tail identifier.

46. The system of claim 41 wherein during the first cycle of the unlock phase, the write circuit writes an invalid indicator to the valid field if the result indicates a hit.

47. The system of claim 41 wherein during the second cycle of the unlock phase, the write circuit writes a valid indicator to the valid field if the result indicates a hit and if the read owner identifier is different than the read tail identifier.

48. The system of claim 41 wherein during the second cycle of the unlock phase, the write circuit writes the read tail identifier to the tail identifier field and the memory address to the tag field at a location in the storage element corresponding to the read next identifier.

49. The system of claim 41 wherein the storage element comprises:

a first content addressable memory (CAM) to store the entries containing the tag field, the valid field, the owner identifier field, and the tail identifier field, the first CAM having a first read decoder to decode a read address and a first write decoder to decode a first write address; and a second CAM to store the entries containing the next identifier field, the second CAM having a second read decoder to decode the read address as the first read decoder and a second write decoder to decode a second write address.

50. The system of claim 49 wherein the write circuit comprises:

a first address selector to select write address for the first write decoder;

a tag register to store the memory address to write to the tag field;

a valid selector to select an indicator to write to the valid field; and a tail identifier selector to select an identifier to write to the tail identifier field.

51. The system of claim 50 wherein the write circuit further comprises:
a second address selector to select write address of the second write decoder; and
a next identifier selector to select an identifier to write to the next identifier field.

52. The system of claim 50 wherein the first address selector selects the request identifier when the result indicates a miss.

53. The system of claim 50 wherein the first address selector selects the read next identifier when the result indicates a hit in the unlock phase.

54. The system of claim 50 wherein the first address selector selects the read owner identifier when the result indicates a hit in the lock phase.

55. The system of claim 50 wherein the tail identifier selector selects the read tail identifier when the result indicates a hit in the unlock phase.

56. The system of claim 50 wherein the tail identifier selector selects the request identifier when the result indicates a hit in the lock phase.

57. The system of claim 51 wherein the second address selector selects the read tail identifier and the next identifier selector selects the request identifier when the result indicates a hit in the lock phase.

58. A computer program product comprising:
a machine useable medium having program code embedded therein, the program code comprising:
computer readable program code to store entries corresponding to threads, each of the threads having a request identifier and generating an access request to a memory for a memory usage of a memory block, each of the threads corresponding to a fixed entry occupied at a predetermined location; and
computer readable program code to control access to the memory, the access including a lock phase before the memory usage and an unlock phase after the memory usage; wherein each of the entries includes an owner ID field containing an owner identifier that corresponds to a thread currently having the memory usage, a tail identifier field containing a tail identifier that corresponds to a last thread in a thread queue, and a next identifier field containing a next identifier that corresponds to a next thread requesting the memory usage.

59. The computer program product of claim 58 wherein each of the entries further includes a valid field containing an indicator that indicates if the corresponding identifiers are valid and a tag field containing a memory address of the access request.

60. The computer program product of claim 59 wherein the computer readable program code to control access to the memory comprises:
computer readable program code to read one of the entries according to a result of the access request in a first cycle; and
computer readable program code to update one of the entries according to the result in one of the first cycle and a second cycle.

61. The computer program product of claim 60 wherein the computer readable program code to the read one of the entries comprises:
computer readable program code to read at least one of the owner identifier, the tail identifier, and the next identifier when the result indicates a hit.

62. The computer program product of claim 61 wherein the computer readable program code to update of the entries during the second cycle of the lock phase comprises:
computer readable program code to write the memory address to the tag field, a valid indicator to the valid field, and the read tail identifier to the tail identifier field at a location in the storage element corresponding to the request identifier when the result indicates a miss.

63. The computer program product of claim 60 wherein the computer readable program code to update one of the entries during the second cycle of the lock phase comprises:
computer readable program code to write the request identifier to the tail identifier field at a location of the storage element corresponding to the read owner identifier when the result indicates a hit.

64. The computer program product of claim 60 wherein the computer readable program code to update one of the entries during the second cycle of the lock phase comprises:
computer readable program code to write the request identifier to the next identifier field at a location of the storage element corresponding to the read tail identifier.

65. The computer program product of claim 60 wherein the computer readable program code to update one of the entries during the first cycle of the unlock phase comprises:
computer readable program code to write an invalid indicator to the valid field if the result indicates a hit.

66. The computer program product of claim 60 wherein the computer readable program code to update one of the entries during the second cycle of the unlock phase comprises:
computer readable program code to write a valid indicator to the valid field at a location in the storage element corresponding to the read next identifier if the result indicates a hit and if the read owner identifier is different than the read tail identifier.

67. The computer program product of claim 60 wherein the computer readable program code to update one of the entries during the second cycle of the unlock phase comprises:
computer readable program code to write the read tail identifier to the tail identifier field and the memory address to the tag field at a location in the storage element corresponding to the read next identifier.

68. The computer program product of claim 60 wherein the computer readable program code to store entries comprises:
computer readable program code to store the entries containing the tag field, the valid field, the owner identifier field, and the tail identifier field in a first content addressable memory (CAM), the first CAM having a first read decoder to decode a read address and a first write decoder to decode a first write address; and
computer readable program code to store the entries containing the next identifier field in a second CAM, the second CAM having a second read decoder to decode the read address as the first read decoder and a second write decoder to decode a second write address.

69. The computer program product of claim 68 wherein the computer readable program to update one of the entries comprises:
computer readable program code to select write address for the first write decoder;
computer readable program code to store the memory address to write to the tag field;
computer readable program code to select an indicator to write to the valid field; and computer readable program code to select an identifier to write to the tail identifier field.

70. The computer program product of claim 69 wherein the computer readable program code to update one of the entries further comprises:

computer readable program code to select write address of the second write decoder; and computer readable program code to select an identifier to write to the next identifier field.

71. The computer program product of claim 69 wherein the computer readable program code to select write address for the first write decoder comprises:

computer readable program code to select the request identifier when the result indicates a miss.

72. The computer program product of claim 69 wherein the computer readable program code to select write address for the first write decoder comprises:

computer readable program code to select the read next identifier when the result indicates a hit in the unlock phase.

73. The computer program product of claim 69 wherein the computer readable program code to select write address for the first write decoder comprises:

computer readable program code to select the read owner identifier when the result indicates a hit in the lock phase.

74. The computer readable program product of claim 69 wherein the computer readable program code to select an identifier comprises:

computer readable program code to select the read tail identifier when the result indicates a hit in the unlock phase.

75. The computer program product of claim 69 wherein the computer readable program code to select an identifier comprises:

computer readable program code to select the request identifier when the result indicates a hit in the lock phase.

76. The computer readable program product of claim 70 wherein the computer readable program code to select write address of the second write decoder comprises computer readable program code to select the read tail identifier, and wherein the computer readable program code to select and identifier to write to the next identifier field comprises computer readable program code to select the request identifier when the result indicates a hit in the lock phase.

* * * * *

UNITED STATES PATENT AND TRADEMARK OFFICE
CERTIFICATE OF CORRECTION

PATENT NO.    : 6,779,089 B2
DATED         : August 17, 2004
INVENTOR(S)   : Lin et al.

It is certified that error appears in the above-identified patent and that said Letters Patent is hereby corrected as shown below:

Column 8,
Lines 47-50, delete "containing an owner identifier that corresponds to a thread currently having the memory usage, a tail identifier field containing a tail identifier that corresponds to".

Column 11,
Line 42, before "selecting", insert -- wherein --.

Signed and Sealed this

Tenth Day of May, 2005

JON W. DUDAS
*Director of the United States Patent and Trademark Office*